(12) United States Patent
Xiang et al.

(10) Patent No.: US 9,945,655 B2
(45) Date of Patent: Apr. 17, 2018

(54) INTERFEROMETRIC APPARATUS AND SAMPLE CHARACTERISTIC DETERMINING APPARATUS USING SUCH APPARATUS

(71) Applicant: University of Huddersfield, Huddersfield (GB)

(72) Inventors: Jiang Xiang, Huddersfield (GB); Haydn Martin, Huddersfield (GB)

(73) Assignee: University of Huddersfield (GB)

( * ) Notice: Subject to any disclaimer, the term of this patent is extended or adjusted under 35 U.S.C. 154(b) by 11 days.

(21) Appl. No.: 14/651,983

(22) PCT Filed: Dec. 12, 2013

(86) PCT No.: PCT/GB2013/053280
§ 371 (c)(1),
(2) Date: Jun. 12, 2015

(87) PCT Pub. No.: WO2014/091237
PCT Pub. Date: Jun. 19, 2014

(65) Prior Publication Data
US 2015/0338202 A1    Nov. 26, 2015

(30) Foreign Application Priority Data
Dec. 13, 2012 (GB) .................. 1222513.2

(51) Int. Cl.
*G01B 9/02* (2006.01)
(52) U.S. Cl.
CPC ........... *G01B 9/02028* (2013.01); *G01B 9/02* (2013.01); *G01B 9/0209* (2013.01); *G01B 9/02078* (2013.01); *G01B 2290/20* (2013.01)
(58) Field of Classification Search
CPC .............. G01B 9/0209; G01B 9/02028; G01B 2290/20; G01J 3/00; G01J 3/45
(Continued)

(56) References Cited

U.S. PATENT DOCUMENTS 5,659,392 A * 8/1997 Marcus ................. G01B 11/06
356/497
5,684,586 A * 11/1997 Fortenberry ............. G01J 11/00
356/450

(Continued)

FOREIGN PATENT DOCUMENTS

GB    2461588 A    1/2010
GB    2479335 A    10/2011

(Continued)

OTHER PUBLICATIONS

Horst Schreiber and John H. Bruning, "Phase Shifting Interferometry", Optical Shop Testing edited by Daniel Malacara, Chapter 14 of the Third Edition, copyright 2007, pp. 547-666.

(Continued)

*Primary Examiner* — Jonathan Hansen
(74) *Attorney, Agent, or Firm* — Lerner, David, Littenberg, Krumholz & Mentlik, LLP

(57) ABSTRACT

An interferometer apparatus comprising: a short coherence length or broadband light source; a light director to direct light from the light source along a measurement path to a surface of a sample and also along a reference path to a reference surface; a wavelength disperser to cause wavelength dispersion of light along one of the measurement and the reference paths; a combiner to cause light from the sample surface and light from the reference surface to produce an interference pattern or interferogram; a detector to detect intensity values of the interference pattern as a function of wavelength; and a determiner to determine from the detected intensity values the wavelength at which the measurement and reference paths are balanced, wherein the wavelength disperser is at least one of: a grating wavelength disperser, a prism wavelength disperser, and an optical dispersive medium.

5 Claims, 6 Drawing Sheets

(58) Field of Classification Search
USPC .................................. 356/451, 479, 497
See application file for complete search history.

(56) References Cited

U.S. PATENT DOCUMENTS

| | | | |
|---|---|---|---|
| 6,124,930 A | 9/2000 | Fercher | |
| 7,551,293 B2* | 6/2009 | Yelin | G01B 9/02027 356/456 |
| 2005/0057757 A1 | 3/2005 | Colonna De Lega et al. | |
| 2007/0076220 A1 | 4/2007 | Kawahara | |
| 2007/0127034 A1 | 6/2007 | Koshimizu et al. | |
| 2011/0304854 A1* | 12/2011 | Li | G01B 11/0675 356/496 |
| 2012/0257207 A1 | 10/2012 | Marx et al. | |
| 2012/0307257 A1* | 12/2012 | Yoshii | A61B 5/0066 356/479 |
| 2013/0077100 A1 | 3/2013 | Fukui et al. | |
| 2013/0215431 A1* | 8/2013 | Ellerbee | G01B 9/02091 356/479 |

FOREIGN PATENT DOCUMENTS

| | | |
|---|---|---|
| GB | 2461588 B | 11/2011 |
| JP | 2003344025 A | 12/2003 |
| WO | 9418521 A1 | 8/1994 |
| WO | 9906794 A1 | 2/1999 |
| WO | 2010082066 A2 | 7/2010 |
| WO | 2012081252 A1 | 6/2012 |
| WO | 2012123122 A1 | 9/2012 |
| WO | 2013000663 A1 | 1/2013 |

OTHER PUBLICATIONS

International Search Report for Application No. PCT/GB2013/053280 dated Jul. 30, 2014.
Pavlicek P et al: "White-Light interferometer with dispersion: an accurate fiber-optic sensor for the measurement of distance", Applied Optics, vol. 44, No. 15, May 20, 2005 (May 20, 2005), pp. 2978-2983, XP002722948.
Search Report for Application No. GB 1222513.2 dated Mar. 6, 2013.

* cited by examiner

Reference arm schematic

Phase difference (dotted) and interferometer output power (solid) against angular wavenumber, $\kappa$

INTERFEROMETRIC APPARATUS AND SAMPLE CHARACTERISTIC DETERMINING APPARATUS USING SUCH APPARATUS

CROSS-REFERENCE TO RELATED APPLICATIONS

The present application is a national phase entry under 35 U.S.C. § 371 of International Application No. PCT/GB2013/053280, filed Dec. 12, 2013, which claims priority from GB Patent Application No. 1222513.2 filed Dec. 13, 2012, the disclosures of which are hereby incorporated by reference herein in their entirety.

This invention relates to interferometric apparatus and sample characteristic determining apparatus using such apparatus.

Determination of surface characteristics such as height, form, waviness, and roughness is important in many areas of technology, not least for quality control and analysis in micro-scale and nano-scale manufacturing processes. The techniques used to measure surface characteristics divide into contact techniques such as the use of a transducer to determine the displacement of a pivotally or axially movable stylus as the stylus follows a surface to be characterised during relative movement between the stylus and the surface and non-contact techniques such as optical techniques, examples being interferometric techniques such as long coherence length interferometric techniques such as phase-shifting interferometry in which, as discussed in Chapter 14 of the second edition of "Optical Shop Testing" by Daniel Malacara ISBN 0-471-52232-5, a series of interferograms are recorded as the reference phase of the interferometer is changed and a phase extraction algorithm is then used to determine the actual phase which is related to the relative surface height, or short coherence length interferometric techniques such as white light or broadband scanning interferometry in which advantage is taken of the fact that the amplitude of the interference fringes produced with a spatially incoherent light source peaks at the position along the scan path of zero path difference between the sample surface and the reference surface and then falls off rapidly, so allowing a surface height profile to be determined by determining the position along the scan path of the coherence peak for different surface elements or surface pixels of the sample surface.

White light scanning interferometry requires relative movement between the sample and reference surfaces in the scan path direction which can be time-consuming and requires that the sample under test itself is stationary. Whilst the range of long coherence length interferometric techniques such as phase-shifting interferometry is limited because of that phase or fringe ambiguity ($2\pi$ ambiguity) issues may arise.

A paper by Pavel Pavilíček and Gerd Hauser entitled "White-light interferometer with dispersion: an accurate fiber-optic sensor for the measurement of distance" published in Applied Optics, Vol 44, No 15, 20 May 205 at pages 2978 to 2983 describes a fibre-optical Michelson interferometer in which a superluminescent diode with a central wavelength of 815 manometers (nm) is coupled to input light via a fibre coupler to sample (measurement) and reference arm optical fibres. A sensor head in the sample arm of the optical fibre Michelson interferometer includes an optical system that focuses light from the sample arm optical fibre onto the sample surface and collects the scattered light which is returned by the sample arm optical fibre to the fibre coupler. Light in the reference arm optical fibre is reflected by a mirror back into the reference arm optical fibre and is returned to the optical fibre coupler where light from the reference and sample arm optical fibres interfere. The reference arm optical fibre has a higher wavelength dispersion than the sample arm optical fibre. Light in the reference arm is thus deliberately subject to chromatic dispersion. This means the interferometer has a wavelength dependent optical path and as such each wavelength has its own distinct "balance point", that is point of zero optical path difference. Spectral analysis of the resulting interferogram enables this point of balance and thus the length of the measurement arm path to be determined. This method provides unambiguous measurement of position with none of the phase-wrapping ($2\pi$ ambiguity) issues found in some forms of interferometer, particularly long coherence length interferometers such as fringe tracking interferometers. However, the requirement for the all optical fibre Michelson interferometer to have separate reference and sample fibre arms means that the interferometer is vulnerable to fibre path length drift and so may be unstable, particularly for sub-micrometer measurement.

An embodiment of the present invention provides an interferometer apparatus comprising: a short coherence length light or broadband light source; a light director to direct light from the light source along a measurement path to a surface of a sample and also along a reference path to a reference surface; a wavelength disperser to cause wavelength dispersion of light along the measurement or the reference path; a combiner to cause light from the sample surface and light from the reference surface to produce an interference pattern or interferogram; a detector to detect intensity values of the interference pattern as a function of wavelength; and a determiner to determine from the detected intensity values the wavelength at which the measurement and reference paths are balanced, wherein the wavelength disperser is at least one of: not an optical fibre wavelength disperser; and selected from the list comprising a grating wavelength disperser, a prism wavelength disperser, and an optical dispersive medium.

The wavelength disperser may comprise two matched transmissive gratings. As another possibility, the wavelength disperser may comprise two matched reflective gratings.

As used herein "light" does not necessarily mean visible light. The light may be infra red or ultra violet light, for example. As used herein "beam" does not necessarily mean a continuous beam, it could be pulsed or otherwise vary in amplitude.

Embodiments of the present invention will now be described, by way of example, with reference to the accompanying drawings, in which.

Figure 1:
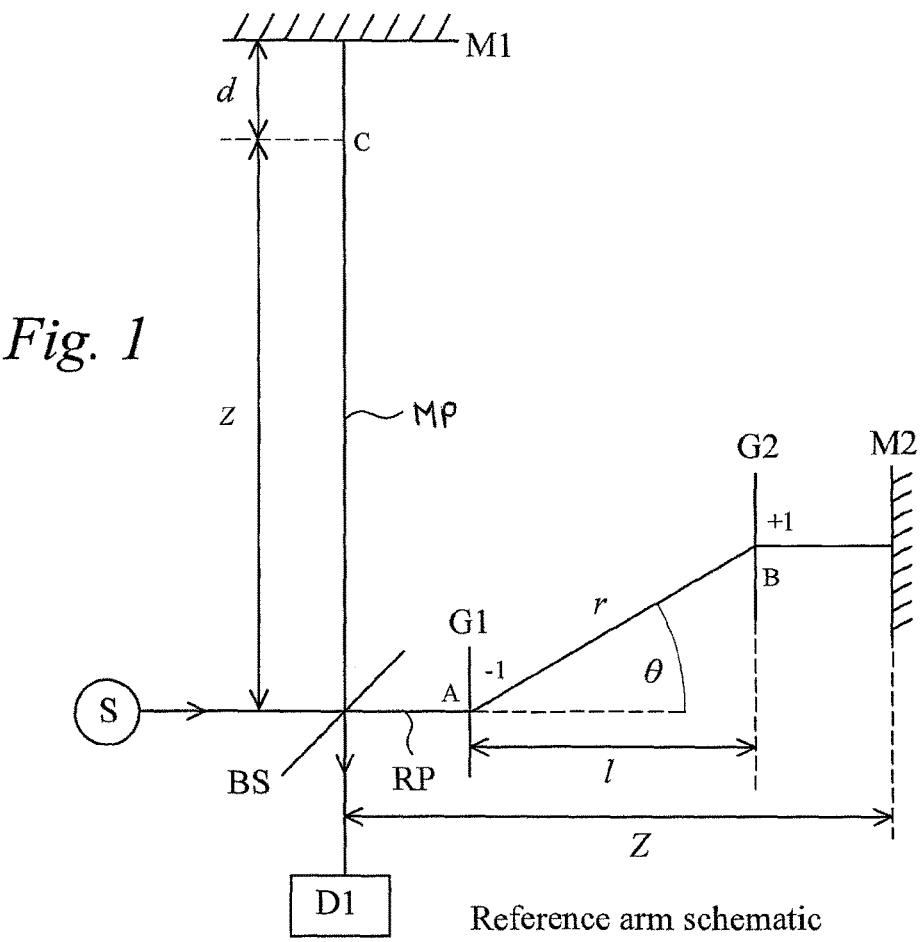
FIG. 1 shows a schematic diagram of a short coherence length interferometer having a wavelength disperser.

With reference to the drawings in general, it should be understood that any functional block diagrams are intended simply to show the functionality that exists within the apparatus and should not be taken to imply that each block shown in the functional block diagram is necessarily a discrete or separate entity. The functionality provided by a block may be discrete or may be dispersed throughout the apparatus or throughout a part of the apparatus. In addition, the functionality may incorporate, where appropriate, hard-wired elements, software elements or firmware elements or any combination of these.

Described herein is an interferometer apparatus comprising: a short coherence length light or broadband light source; a light director to direct light from the light source along a measurement path to a surface of a sample and also along a reference path to a reference surface; a wavelength disperser to cause wavelength dispersion of light along the reference path; a combiner to cause light from the sample surface and light from the reference surface to produce an interference pattern; a detector to detect intensity values of the interference pattern as a function of wavelength; and a determiner to determine from the detected intensity values the wavelength at which the measurement and reference paths are balanced, wherein the wavelength disperser is not an optical fibre wavelength disperser and/or is selected from the list comprising: a grating wavelength disperser, a prism wavelength disperser, and a optical dispersive medium.

The provision of such a wavelength disperser that causes wavelength or chromatic dispersion in the reference path or arm means that this short coherence length interferometer (SCDRI) has a wavelength dependent optical path and as such each wavelength has its own distinct balance point, i.e. point of zero optical path difference, between the measurement and reference paths. Spectral analysis of the resulting interferogram or interference pattern signal can yield this point of balance and thus the length of the measurement path. This enables measurement of position without $2\pi$ ambiguity, that is without phase-wrapping issues, as found in long coherence length interferometers such as fringe tracking interferometers, without being vulnerable to the fibre path length drift which may arise if reliance is placed on optical fibre to provide wavelength dispersal. Such an interferometer is referred to herein as a short coherence dispersed reference interferometer (SCDRI)

There is also described apparatus for determining information relating to a sample characteristic using such a short coherence dispersed reference interferometer. Such apparatus may enable, as examples, displacement measurement and surface metrology and film measurement. For surface metrology, a suitable objective lens assembly (probe) may be provided for focussing or collimating (dependent upon the application) light onto the measurand surface. Either the focussed (or collimated) beam or the sample (measurand) may then be scanned in one or more directions, generally x or y, perpendicular to the measurement path direction, generally z, in order to retrieve a set of measurement points representing the surface topography of the measurand. Analysis of the thicknesses of optically transparent films using this technique may also be possible.

Use of a short coherence length broadband light source enables the use of stable optical fibre based remote probes using common fibre path techniques. This allows some embodiments to have optical fibre probes remotely located from the main part of the interferometer. Multiple probes may be provided and coupled to the main part of the interferometer using time division multiplexing techniques, for example using an optical fibre switch.

The principle of operation of a short coherence dispersed reference interferometer will now be described by reference to the case where the interferometer is a Michelson interferometer with the beam in the reference arm chromatically dispersed, although other types of interferometer may be used. For example, a Twyman-Green or a Mach-Zehnder interferometer could be used by adding chromatic dispersion to the reference arm. This description is followed by a number of illustrative examples.

FIG. 1 shows a schematic representation of a short coherence dispersed reference interferometer having a short coherence length or broadband light source S, a beam splitter BS and measurement and reference arms having measurement and reference surfaces providing measurement and reference paths MP and RP, respectively, and a detector D1 to detect an interference signal produced by interference between light returning along the measurement path and light returning along reference path at the beam splitter which thus acts as a combiner. The short coherence length or broadband light source S may be, for example, a Super Luminescent Diode (SLD) (also known as a Super-luminescent Light Emitting Diode (SLED)) or a filtered white light source, for example a halogen light source. The detector D1 comprises a spectrometer which provides a wavelength dependent output. Thus, as an example, light may be incident on a sensor array of the spectrometer at a position determined by its wavelength. The output of the detector D1 may be supplied to a data processor 100. For the purposes of this explanation with reference to FIG. 1, the measurement and reference surfaces are formed by mirrors M1 and M2, although in practice the measurement surface may be a surface of a sample (measurand) being examined.

The reference arm of the interferometer also includes a wavelength disperser shown in FIG. 1 as a pair of matched transmissive diffraction gratings G1 and G2.

Light traveling from the beam splitter BS to the reference mirror M2 traverses both diffraction gratings G1 and G2 and is reflected back along the same path by the mirror M2. Depending on the combination of grating period and operational wavelength, multiple diffraction orders may be present at each diffraction grating G1, G2. For the purposes of this analysis only the negative first order −1 is taken from the diffraction grating G1 and the opposing positive first order +1 from the diffraction grating G2. The effect of the diffraction grating G2 is to re-collimate the dispersed beam from the diffraction grating G1, any other diffracted orders are assumed to be blocked. If necessary the required diffraction may be selected by blocking of other diffraction orders, such that they are not incident on the gratings, or by use of an appropriate slit or aperture. Light returning along the measurement and reference paths is recombined at the beamsplitter BS and the resulting interferogram is spectrally analysed by the detector D1 which provides an output which may then be processed by the data processor 100.

For any given diffraction order, the angle of diffraction, θ, increases with wavelength, λ. In the case of normal incidence, sin θ=mλ/D, where in is the order of diffraction and D is the grating period. In terms of angular wavenumber, k, this relationship becomes:

$$\sin\theta = \frac{2\pi m}{Dk} \qquad 1$$

The wavenumber dependent optical path, r(k) in air between points A and B, that is between the two diffraction gratings G1 and G2, is then:

$$r(k) = l/\cos\left[\arcsin\left(\frac{2\pi}{Dk}\right)\right] = \frac{l}{\sqrt{1-\left(\frac{2\pi}{Dk}\right)^2}} \qquad 2$$

where l is the perpendicular separation between G1 and G2 and only the first diffraction order, m=1, is considered.

If the distance, z, between the beam splitter BS and some reference position C along the measurement path is set equal to the perpendicular displacement of the beam splitter BS from the reference mirror M2 and the displacement of the measurement mirror M1 from this reference point C is defined as d, then the optical path difference OPD between the reference path length, $L_r=2[z-l+r(k)]$ and the measurement path length, $L_m=2(z+d)$ is given by:

$$OPD=L_r-L_m=2[r(k)-l-d] \qquad 3$$

Where l, z and d are optical path lengths and taken to be through the same medium so that the refractive index is the same in each case.

If the grating parameters and operating wavelength range are such that the factor Dk>>2π in equation 3 and the bandwidth of the source S is small compared to the central wavenumber $k_c$, then the rate of change of r(k) can be considered to be constant over the region of interest and it is then possible to substitute a linear approximation into equation 2 such that $r(k) \approx r(k_c)+\alpha(k-k_c)$ where $k_c$ is the central wavenumber of the source and $$\alpha = r'(k_c) = \frac{-4\pi^2 l}{D^2 k_c^3 \left[1-\left(\frac{2\pi}{Dk_c}\right)^2\right]^{3/2}} \qquad 4$$

Considering the interferometer as a whole, the phase difference, φ(k) is then a quadratic function given by:

$$\varphi(k)=2k[r(k_c)+\alpha(k-k_c)-l-d] \qquad 5$$

and thus the resulting interferogram intensity is given by:

$$I(k) = \frac{I_0(k)}{2}\{1 + V\cos[\phi(k)]\} \qquad 6$$

where $I_0(k)$ is the spectrum of the source S and V is the visibility contrast of the interferometer.

Figure 2:
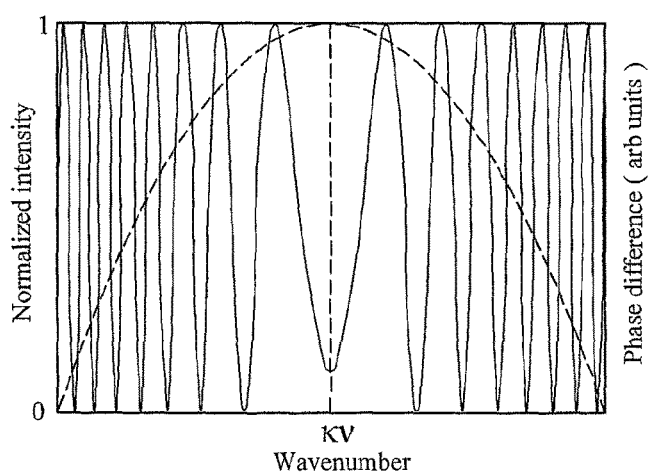
FIG. 2 shows a graph showing in solid lines normalised intensity against wavenumber and in dotted lines phase difference against wavenumber for interference produced by light from a surface pixel or surface element of a sample surface.

FIG. 2 shows in solid line an example interferogram representing measured intensity l(k), normalized to lie within the range 0 to 1, against wavenumber k, and in dotted line the corresponding phase difference in arbitrary units. The plotted phase function forms a parabola with a vertex at the wavenumber, $k_v$, at which the interferometer is balanced, that is the wavenumber, $k_v$, at which the optical path length difference (OPD) between the measurement and reference paths is zero. FIG. 2 shows that the interferogram is symmetrical about the wavenumber associated with the phase vertex or peak.

For any given OPD, the interferometer is balanced at a single wavenumber only. Solving equation 5 for the wavenumber at the vertex, $k_v$, and rearranging in terms of the measurement mirror M1 displacement, d yields an OPD:

$$d=r(k_c)+\alpha(2k_v-k_c)-l \qquad 7$$

The interferometer is balanced at the central wavenumber of the source when $k_v=k_c$ which occurs at an OPD of $d_0=r(k_c)+\alpha k_c-l$. The displacement $d_m$ of the measurement arm in relation to this central balanced wavenumber is therefore:

$$d_m=d-d_0=2\alpha(k_c-k_v) \qquad 8$$

Thus, the displacement of the measurement mirror M1 (which in practice may be a sample or measurand) along the measurement path direction about the central point of balance may be monitored absolutely by determining the wavenumber at which the point of symmetry of the interferogram occurs. The relationship between that wavenumber and the displacement may be usefully scaled by altering the parameters associated with the factor, a as defined in equation 4.

A short coherence length interferometer operating in accordance with the principle discussed above can thus produce an absolute displacement measuring system by determining the wavenumber at the point of symmetry. The point of symmetry can be calculated by the data processor 100 using any appropriate peak finding operation such as an autoconvolution or equivalent operation, the peak value being related to the point of symmetry.

Figure 3:
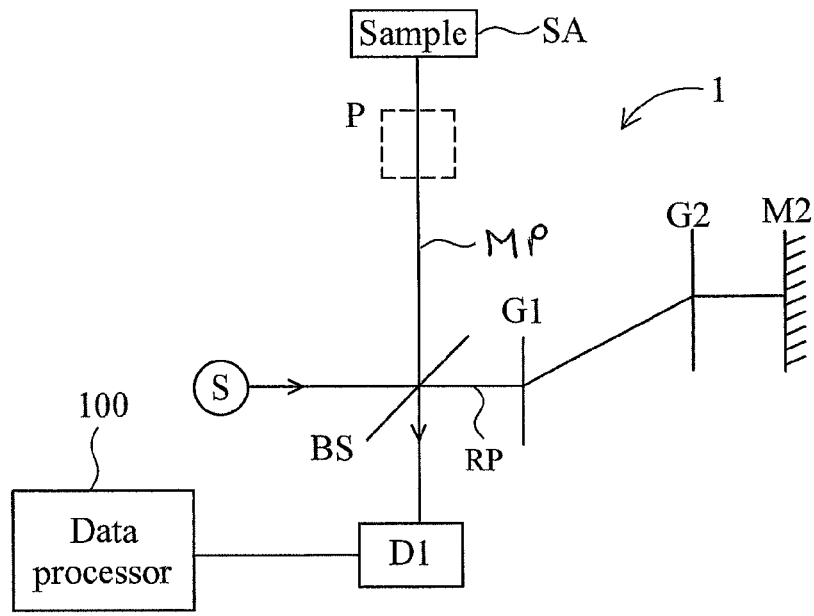
FIG. 3 shows a schematic diagram of a short coherence length interferometer apparatus in which a wavelength disperser comprises a pair of matched transmission gratings.

FIG. 3 shows a schematic view of a short coherence dispersed reference interferometer apparatus 1 in which the measurement mirror M1 of FIG. 1 is replaced by a sample SA and an objective lens assembly (optical probe) P, shown simply by a dashed line, is provided to focus or collimate the light, as befits the application, on to the sample or measurand SA.

Light from the short coherence length source S is directed along the two arms or measurement and reference paths MP and RP of the interferometer by the beamsplitter BS. As discussed above, the negative first order −1 is taken from the diffraction grating G1 and the opposing positive first order +1 from the diffraction grating G2 which re-collimates the dispersed beam from the diffraction grating G1. Light returning along the measurement and reference paths is recombined at the beamsplitter BS and the resulting interferogram is spectrally analysed by the detector D1 which provides an output which may then be processed by the data processor 100.

Figure 4:
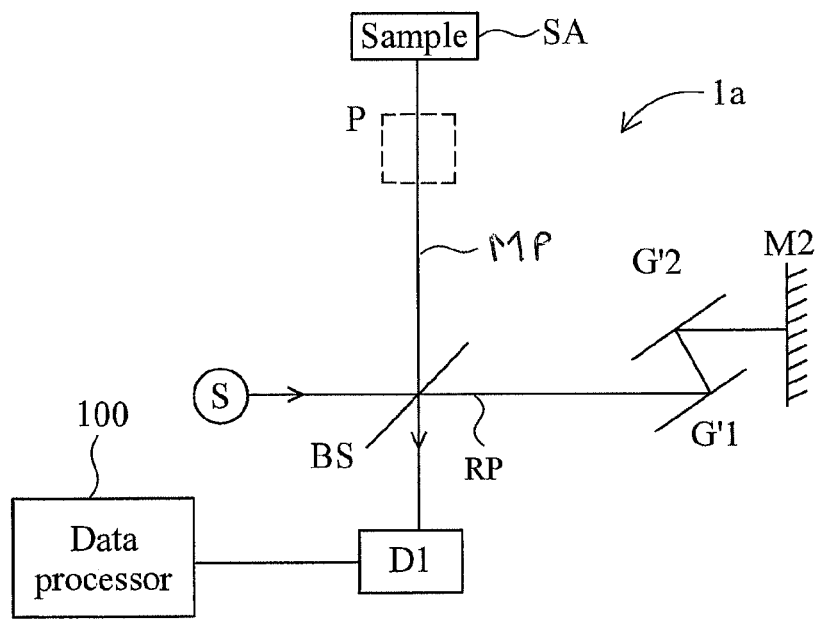
FIG. 4 shows a schematic diagram of a short coherence length interferometer apparatus in which a wavelength disperser comprises a pair of matched reflective gratings.

FIG. 4 shows a schematic view of a short coherence dispersed reference interferometer apparatus 1a similar to that shown in FIG. 3 but in which the wavelength disperser is provided by two matched reflective gratings G'1, G'2 in the reference arm. The use of reflective gratings may provide higher dispersion in a shorter path length and higher efficiency because a higher groove density is possible with reflective gratings as opposed to transmissive gratings.

As in the example shown in FIG. 3, light from the short coherence length source S is directed along the two arms or measurement and reference paths MP and RP of the interferometer by the beamsplitter BS. In this example, the first diffraction order is taken from the reflective grating G'1, thus producing the required dispersion, whilst the equivalent diffraction order taken the reflective grating G'2 re-collimates the beam for reflection by the mirror M2. Light returning along the measurement and reference paths MP and RP is again recombined at the beam splitter BS and the resulting interferogram is spectrally analysed by the detector D1 which provides an output which may then be processed by the data processor 100.

In the examples shown in FIGS. 3 and 4, the objective lens assembly (optical probe) P is local to the interferometer apparatus. As another possibility, the objective lens assembly (optical probe) may be remote from the remainder of the interferometer apparatus and coupled to the remainder of the interferometer apparatus by an optical coupling.

Figure 5:
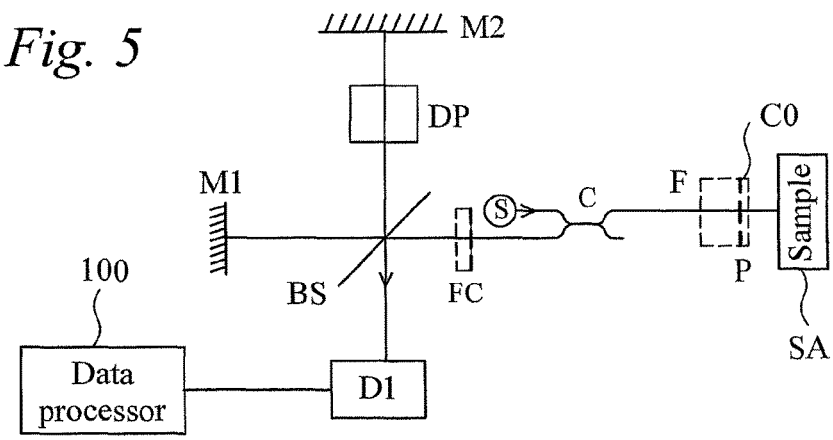
FIG. 5 shows a schematic diagram of a short coherence length interferometer apparatus in which an optical fibre coupling is provided to a probe head.

FIG. 5 shows an example of a short coherence dispersed reference interferometer apparatus with a remote objective lens assembly (optical probe) P coupled to the remainder of the interferometer by an optical fibre coupling.

In the example shown in FIG. 5, light from the short coherence length source S is coupled into an arm of a fibre optic combiner C coupled to a length of optical fibre F coupled to the remote objective lens assembly (optical probe) P. The combiner C may take the form of a directional coupler, circulator or other suitable fibre component.

The probe P focuses or collimates light exiting the optical fibre F onto the sample or measurand SA to provide the measurement beam. The probe P has a partially reflective surface that provides the beamsplitter to split light into the measurement and reference beams so that the reference beam is provided by a proportion of the light that is reflected back into the optical fibre F without falling on the sample SA. This partial reflectance may be achieved by Fresnel reflection, either at the front surface/air boundary of the probe or the optical fibre/air boundary from the optical fibre end providing light to the probe P. This partial reflectance can if necessary be enhanced by the use of suitable optical coatings. As another possibility, the partially reflective surface may be provided a separate element placed in front of the lens assembly of the probe or an uncoated/partial reflective coated surface in the lens assembly. For reasons of simplicity, the coated element may be the element nearest the measurand SA. The element CO shown in dashed lines in FIG. 5 represents the separate element or uncoated/partial reflective coated surface.

In this example, the use of optical fibre to provide at least part of the light path is possible because the path through the optical fibre is common to the reference and measurement paths and the distance between the partially reflecting surface at point P and the sample SA is longer than the coherence length of the short coherence length source S, so that the measurement and reference beams propagate back through the optical fibre without interfering coherently. During this propagation the measurement and reference beams will both be subject to the same phase changes resulting from any disturbances of the fibre through environmental perturbations such as temperature changes or vibration.

The objective lens assembly (optical probe) P may be, for example, a bulk optic objective lens assembly or a graded index optical fibre collimator or a graded index optical fibre focuser. As other possibilities, the probe may be a bulk optic fibre collimator/focuser. Other possible fibre probe types include fused ball lens and fused taper fibre probes. Optionally, the probe P may be configured to enable the measurement beam to exit at an angle or range of angles to the length of the fibre, for example the probe may be a side-firing probe from which the beam exits orthogonally to the fibre input, allowing measurements to take place in difficult-to-access areas, for example on the walls of high aspect ratio structures such as bore holes.

Upon re-entering the coupler C, a portion of the reference and measurement beams propagates to a fibre collimator FC where it is collimated into free space and incident on the beamsplitter BS. The beamsplitter BS splits the light into two paths terminated by respective mirrors M3 and M4, thus forming the interferometer. The reference arm of the interferometer contains the wavelength disperser DP to cause chromatic dispersion of the light propagating through it. The wavelength disperser DP may have any of the forms discussed herein, for example the matched reflective or transmissive gratings discussed above. The two interferometer arms are un balanced such that they bring into coherent interference the measurement and reference beam components travelling from the probe P. The resulting interferogram is analysed spectrally by the detector D1 which provides an output which may then be processed by the data processor 100.

Figure 6:
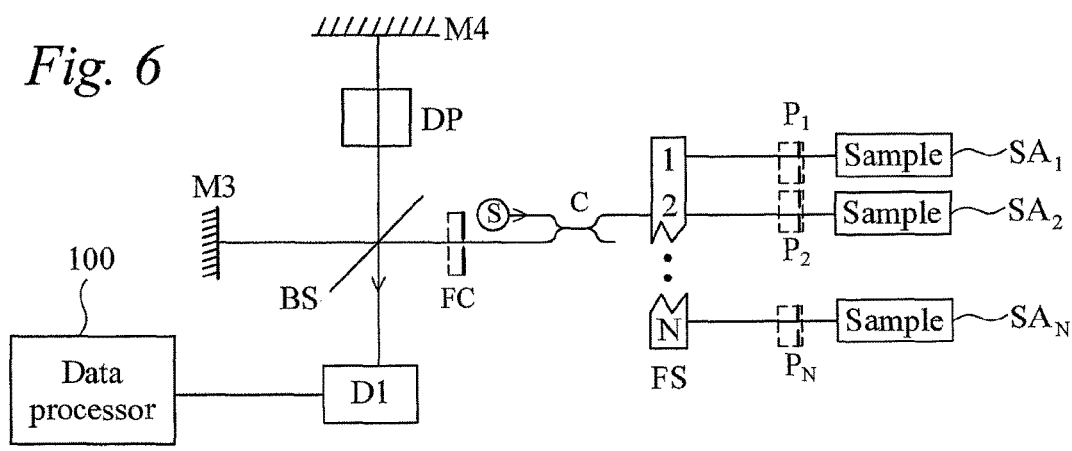
FIG. 6 shows a schematic diagram of a short coherence length interferometer apparatus in which a multiplexed optical fibre coupling is provided to multiple probe heads.

FIG. 6 shows how the short coherence dispersed reference interferometer apparatus shown in FIG. 5 may be extended to multiple optical probes if the output of the fibre optic coupler C is time division multiplexed by way of a 1×N fibre optic switch FS. This enables the interferometer apparatus to interrogate N optical probes labelled P1 to PN by switching sequentially between the fibre optic switch outputs at high speed. In this way several samples SA1 to SAN, or several points on a single sample SA, may be measured.

Embodiments of the apparatus described above enable retrieval of high-resolution measurement. Other ways of achieving a high-resolution measurement will be described below with reference to FIGS. 7 and 8.

A short coherence dispersed reference interferometer apparatus may be multiplexed with a second interferometer to provide a high resolution apparatus for the measurement of displacement and surface topography. The second interferometer may be a long coherence length source interferometer capable of providing high resolution measurement but having a limited range due to phase ambiguity induced fringe order ambiguity. This high resolution second interferometer may be, for example, a homodyne phase shifting or a heterodyne interferometer and is limited to a range of half the source wavelength before phase-wrapping occurs. In this example, the short coherence dispersed reference interferometer apparatus is used as a fringe order discriminator, that is to pinpoint which fringe order the long coherence length interferometer is operating on, so enabling the high resolution apparatus to operate over a large range (many fringe orders) even where a sample having discontinuities such as a step height change of surface topography or significant form is being measured.

Figure 7:
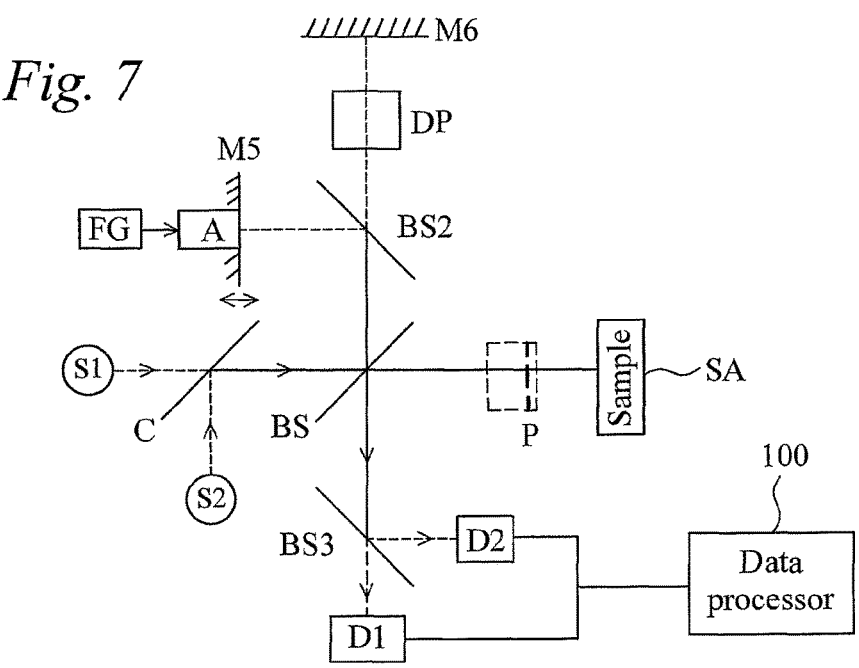
FIG. 7 shows a schematic diagram of interferometer apparatus which also includes a long coherence length phase shifting interferometer.

FIG. 7 shows an example of such a combined apparatus. In this example, the high resolution interferometer is a phase shifting homodyne interferometer with a long coherence length laser source S1 of a wavelength outside the wavelength range or bandwidth of the short coherence length source S2 of the short coherence dispersed reference interferometer. For example, the short coherence length source S2 may have a wavelength range of 817 to 837 nm (nanometers) and the long coherence source S1 may have a wavelength of 633 nm.

Light from the long coherence length laser source S1 and light from the short coherence length source S2 are combined by a combiner C (which may be for example a reflective mirror, a dichroic mirror or a beamsplitter) to form a single beam which is then separated by a beamsplitter BS into the two interferometer arms. The measurement beam is focussed or collimated, depending on the application, on the sample SA by the probe P which may be as described above. The reference beam travels to a dichroic beam separator BS2 which separates light at the long coherence length laser source wavelength from the short coherence length source light. The short coherence length source light travels through the wavelength disperser DP and is reflected by the mirror M6. The long coherence length source light propagates to the mirror M5 which is moved by an actuator A driven by waveform or function generator FG. The actuator A may be a piezo-electric element or micro-motor, for example. The combination of mirror M5 and actuator A acts as a phase shifter so that the long coherence length interferometer forms a phase shifting interferometer. Phase shifting interferometry is discussed in chapter 14 of the third edition of "Optical Shop Testing" edited by Daniel Malacara (ISBN 978-0-471-48404-2). The combination of mirror M5 and actuator A could be replaced by any appropriate mechanism for achieving phase shifting such as a rotating half wave polarizer, moving diffraction grating, electro-optic phase shifter or acousto-optic phase shifter, together with an appropriate control or driver.

The light beams reflected from mirrors M5 and M6 respectively are recombined at the dichroic beam separator BS2 and pass to the beamsplitter BS where they interfere with their respective beams reflected back from the sample SA. The resulting interference passes to a dichroic beamsplitter BS3 where they are again separated into a long coherence length interference beam which is received by a fast detector D2 such as a photodiode and a short coherence length interference beam which received by a spectrally analyzed by the spectral analysis detector D1. The spectral analysis detector D1 may be the same as the detector D1 described above. The outputs of the detectors D1 and D2 are supplied to the data processor 100.

The fast detector D2 acts to monitor the intensity of the interference beam as the phase is shifted. The data processor 100 records the intensity of the interference beam as the phase is shifted and processes the recorded intensities to determine a phase value which relates to the distance of the sample surface from the probe P. Any appropriate phase shifting algorithm may be used, for example any phase shifting algorithm discussed in chapter 14 of the third edition of "Optical Shop Testing" edited by Daniel Malacara (ISBN 978-0-471-48404-2) such as the Schwider-Hariharan or Carré which are discussed at pages 574 to 580.

The spectral analysis detector D1 acts to determine absolutely the distance of the sample from the probe P in the manner outlined above with respect to, for example, FIGS. 1 and 2. The interferometer is scaled in accordance with equation 4 above, that is the dispersive interferometer is setup or adjusted to provide a resolution of less than one half of the wavelength of the long coherence length source S1 so that the fringe order of the long coherence length interferometer can be determined.

Figure 8:
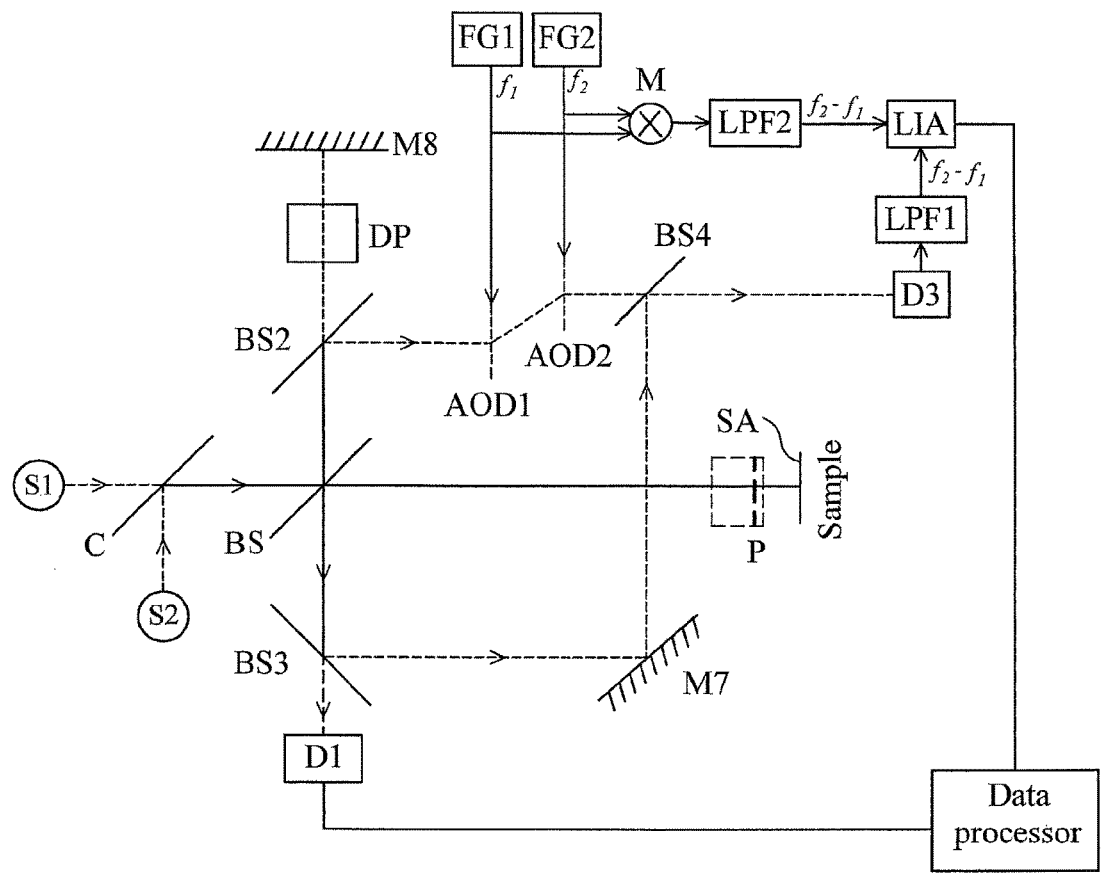
FIG. 8 shows a schematic diagram of an interferometer apparatus which also includes a long coherence length heterodyning interferometer.

FIG. 8 shows another example of a combined apparatus in which a heterodyne method is used to resolve the phase of a long coherence length interferometer.

As shown in FIG. 8, light from the long coherence length laser source S1 and light from the short coherence length source S2 are combined by a combiner C (which may be, for example, a reflective mirror, a dichroic mirror or a beamsplitter) to form a single beam which is then separated by a beamsplitter BS into the two interferometer arms. The measurement beam is focussed or collimated on the sample SA, depending on the application, by the probe P. The reference beam travels to a dichroic beam separator BS2 which separates light at the long coherence length laser source wavelength from the short coherence length source light.

The long coherence length beam separated from the short coherence length beam at the dichroic beam splitter BS2 passes through a pair of acousto-optic deflectors (AODs), AOD1 and AOD2, which up-shift the optical frequency to allow heterodyning with the base optical frequency beam incident on the sample SA via the optical probe P. In detail, the optical frequency of this beam is down-shifted by a frequency, $f_1$ applied to AOD1 by a first waveform or function generator FG1, the negative first order diffraction beam from AOD1 is passed to AOD2, with the aperture of the AOD acting effectively as slit to vignette all but the required diffracted beam, and up-shifted by a frequency, $f_2$, applied to AOD2 by a second waveform or function generator FG2 and the positive first order is selected. The total frequency shift of the resulting beam exiting AOD2 is thus $f_2-f_1$. Light returning from the sample SA is separated into the long coherence length and short coherence length wavelengths by dichroic beamsplitter BS3 and the long coherence length light is reflected by mirror M7 towards beamsplitter BS4 where it interferes the frequency shifted beam. The interference beam containing the optically mixed frequency components is incident on a photodiode detector D3. The electrical output of the photodiode detector D3 is passed through a low pass filter LPF1 which outputs a signal at the difference frequency of $f_2-f_1$ with a phase dependent on the distance of the sample SA surface from the optical probe P. A phase-stable reference signal is generated by electrically mixing signals of frequencies $f_2$ and $f_1$ provided by the waveform or function generators FG1 and FG2, respectively, in a mixer M and then passing the output through a low pass filter LPF2 to retrieve only the difference frequency $f_2-f_1$. This electrically generated difference frequency signal is input as a reference signal to a phase sensitive detector or lock-in amplifier LIA which tracks or locks to the phase change of the signal obtained from the photodiode detector D3. The lock-in amplifier LIA may provide a phase signal output to the data processor 100. This phase relates to the distance of the sample surface from the optical probe P.

The short coherence length source light travels through the wavelength disperser DP and is reflected by the mirror M8 back to beam splitter BS2 and thence to the beamsplitter BS where it interferes with the short coherence length source light reflected from the sample. The short coherence length source light interference is passed by beamsplitter BS3 to detector D1, the output of which may be passed to data processor 100. The short coherence length interferometer is again used to determine the fringe order.

Figure 9:
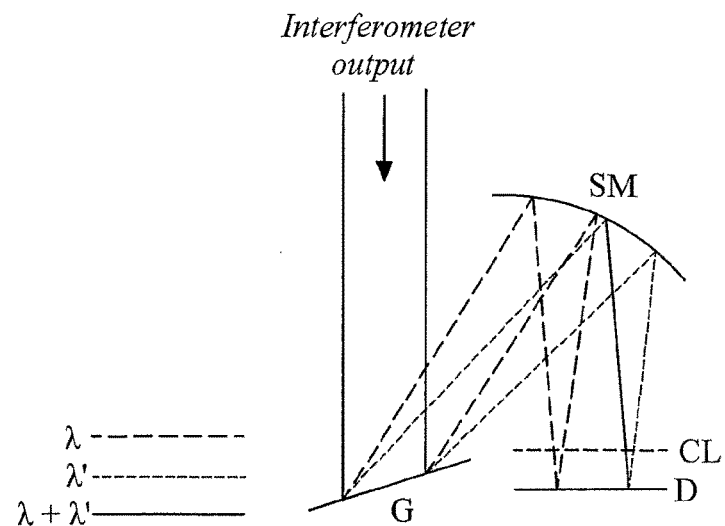
FIG. 9 shows a schematic diagram of a detector that may be used by interferometer apparatus.

Any suitable spectrometer, spectrophotometer or spectrograph or monochromator could be used for as the detector D1. An example is illustrated in FIG. 9. In this example the detector D1 is a spectrometer consisting of a grating G, collimating spherical mirror SM and linear sensing element array CD (for example a CCD or CMOS sensor array) with different wavelengths ($\lambda$, $\lambda'$ and $\lambda+\lambda'$ being shown in dashed, dotted and solid lines, respectively) being incident on different sensing elements of the array CD so that an optical spectrograph is provided by linearly dispersing the broadband light exiting the interferometer across the array which is then read out by a electronic interface to provide a data input to the data processor 100. Any variant on this spectrometer would be suitable e.g. a Czerny-Tumer or a Fastie-Ebert monochromator may be used.

Figure 10:
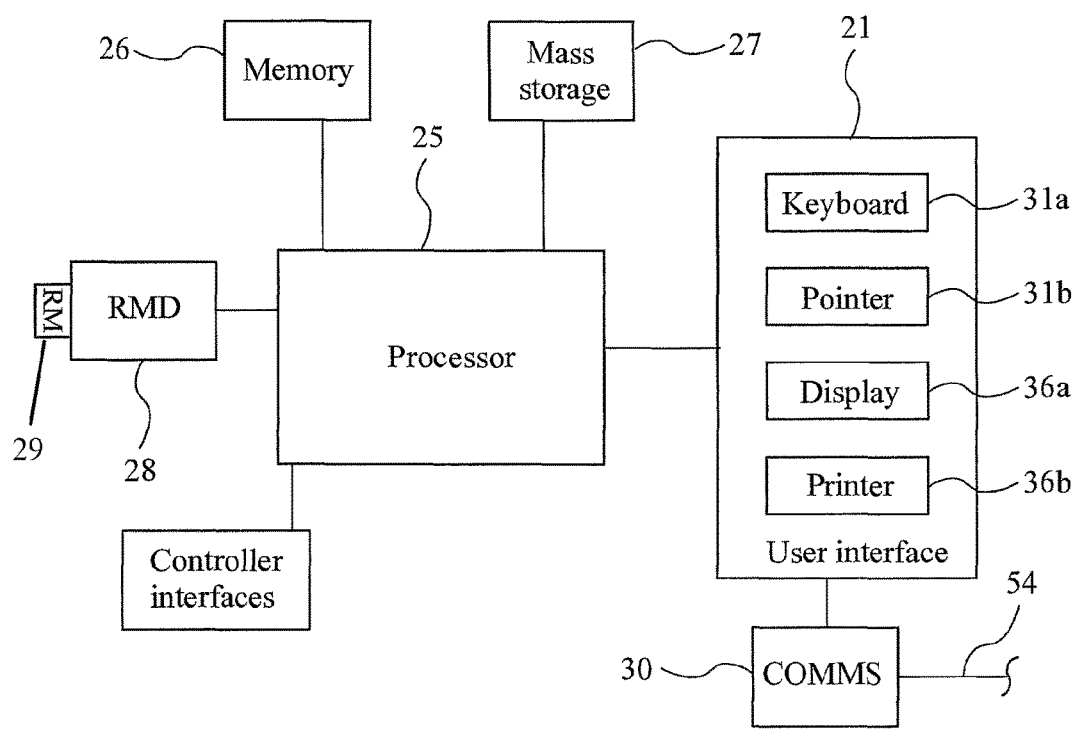
FIG. 10 shows a functional diagram of computing apparatus that may be programmed to provide data processing of an interferometer apparatus.

FIG. 10 shows a simplified block diagram of computing apparatus that may provide the data processor 100. The computing apparatus may be a PC or other general purpose computing apparatus, for example. As shown, the computing apparatus has a processor 25 associated with memory 26 (ROM and/or RAM), a mass storage device 27 such as a hard disk drive, a removable medium drive RMD 28 for receiving a removable medium RM 29 such as a floppy disk, CDROM, DVD, thumb drive or USB or memory stick or the like, a user interface 21 and a communications interface COMMS 30. The user interface 21 may consist of a user input consisting, for example, of a keyboard 31*a* and a pointing device 31*b*, and a user output 36 consisting, in this example, of a display such as a CRT or LCD display 36*a* and a printer 36*b*. The communications interface 30 may be a modem or network card that enables the computing apparatus to communicate with other computing apparatus over a network such as a local area network LAN, wide area network WAN, an Intranet or the Internet.

The processor 25 may be programmed to provide required functionality by, for example, any one or more of the following ways:

1. by pre-installing program instructions and any associated data in a non-volatile portion of the memory 26 or on the mass storage device 27;
2. by downloading program instructions and any associated data from a removable medium 29 received within the removable medium drive 28;
3. by downloading program instructions and any associated data as a signal SG supplied from another computing apparatus via the communications interface 30; and
4. by using the user input of the user interface.

The computing apparatus (or a different computing apparatus communicating with the computing apparatus) may also serve to control, via appropriate interfaces, operation of components of the interferometer apparatus such as the light source(s), actuator, and function generators described above. The computing apparatus, when programmed by program instructions, may enable a measurement operation to be controlled in accordance with instructions received by a user via the user interface and/or may allow the measurement results to be analyzed and the results of the analysis displayed to the user.

As other possibilities data processing and control may be implemented in any appropriate manner using DSPs or microcontrollers alone or in any appropriate combination. Control may be hardwired or software driven depending upon the circumstances and requirements.

Figure 11:
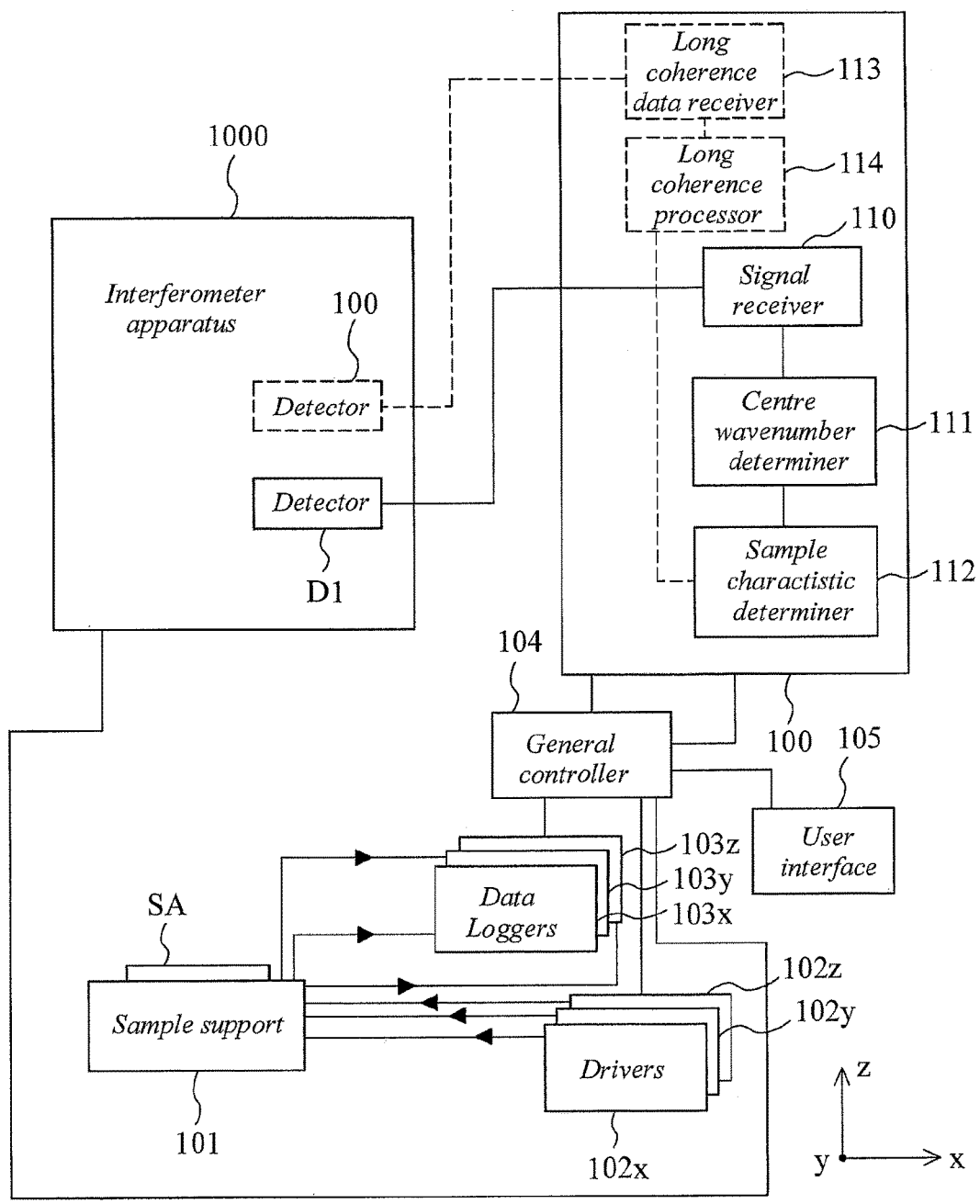
FIG. 11 shows a functional diagram of data processing and control functionality of a sample characteristic determining apparatus.

FIG. 11 shows a block diagram illustrating one way in which data processing and control functionality may be provided. In the interests of simplicity in FIG. 11, the interferometer apparatus is shown simply as a block 1000 with only the detector D1 and the longer coherence length detection system 100 (D2 or the combination of elements shown in FIG. 8) being shown. The long coherence length source detection system is shown in phantom lines to illustrate that it may not be present.

In this example, the sample or measurand SA is supported on a sample support 101 which is movable in at least one of the x and y directions in FIG. 11 by respective drivers 102*x* and 102*y* to enable different surface pixels (that is the area of the sample surface imaged by the interferometer) to be examined by the interferometer apparatus. The sample support may also be movable in the z direction by a z driver 102*z*, for example for positioning purposes. Each of the drivers is associated with a corresponding data logger 103*x*, 103*y*, 103*z* which provides an output to a general controller 104 of the data processing and control system to enable determination of the relative x and y (and possibly z) locations of different surface pixels examined by the interferometer apparatus to be determined.

The data processing and control system has a user interface 105 which may be as discussed with reference to FIG. 10 and may be used to enable a user to input instructions to control operation of the interferometer apparatus and to view output data.

The data processor 100 has, in this example, a signal receiver 110 for receiving the output of the spectral analysis detector D1, a centre wavenumber determiner 111 to determine the centre wavenumber as discussed above with reference to FIGS. 1 and 2, for example by using an autocorrelation algorithm or any other suitable peak finding algorithm. A sample characteristic determiner 112 is provided to determine a sample characteristic using the determined centre wavenumber and the outputs of appropriate data loggers. For example, a surface profile or 2D topography may be determined from the centre wavenumbers determined for different surface pixels examined as the sample support is moved in the x and/or y direction.

Where the interferometer apparatus also includes a long coherence length interferometer, then the data processing apparatus include a long coherence length data receiver 113 and a long coherence length processor 114 processes the long coherence length data, for example using a phase shift algorithm in the case of the interferometer apparatus shown in FIG. 7. In this case, the sample characteristic determiner 112 uses the output of the centre wavenumber determiner 111 to disambiguate phase or fringe order.

Although as described above the sample support is moveable, it will be appreciated that another possibility would be to move the interferometer apparatus, particularly the probe head if it is separate, or to effect relative movement between the sample support and the interferometer apparatus. It will, of course be appreciated that not all of the drivers 102 and their corresponding data loggers 103 may be provided. As an example, there may be a single driver 102*x* and corresponding data logger 103*x* to enable surface profiles to be generated.

Although Michelson interferometers have been described above, other appropriate interferometers may be used. Also although particular diffraction orders have been mentioned above, other any suitable diffraction orders may be used. In some instances a higher order diffracted beam may be advantageous as it provides more chromatic dispersion although with increased optical losses. As described above the wavelength dispersion is provided on the reference path. As another possibility, the wavelength dispersion could be applied to the measurement arm, between the probe and beamsplitter BS.

The gratings discussed above, whether transmissive or reflective (c.f. FIG. 4), should be identical in order that the exiting beam (incident on the reflecting mirror) is collimated. As another possibility, a single grating may be used followed by a spherical mirror to disperse and collimate the beam before incidence on the reflecting mirror.

As described above l, z and d are all optical path lengths through the same medium, in the event the paths might be through different media then account would need to be taken of their respective refractive indices in the determination of the optical path lengths.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention which is set out in the following claims. It will be appreciated that as used herein the term "comprising" or "comprises" does not necessarily mean consists solely of but includes the possibility of the apparatus including other functionality or components.

The invention claimed is:

1. An interferometer apparatus comprising:
a short coherence length or broadband light source; a light director to direct light from the light source along a measurement path to a surface of a sample and also along a reference path to a reference surface;
a wavelength disperser to cause wavelength dispersion of light along one of the measurement and the reference paths; a combiner to cause light from the sample surface and light from the reference surface to produce an interference pattern or interferogram;
a detector to detect intensity values of the interference pattern as a function of wavelength;
a determiner to determine from the detected intensity values the wavelength at which the measurement and reference paths are balanced, wherein the wavelength disperser is at least one of: a grating wavelength disperser, a prism wavelength disperser, and an optical dispersive medium;
a phase shifting interferometer having a long coherence length laser source of a wavelength outside the wavelength range or bandwidth of the short coherence length source;
a further combiner to combine light from the long coherence length laser source and light from the short coherence length source to form a combined beam, the director comprising a beamsplitter to separate the combined beam into a measurement beam and a reference beam;
an objective lens assembly to direct the measurement beam towards the sample;
a dichroic beam separator to direct the long coherence length laser source wavelength to a first mirror and the short coherence length source light through the wavelength disperser to a second mirror; and
an actuator to cause phase-shifting of the first mirror, wherein the apparatus is configured such that light reflected from the first mirror and light reflected from the second mirror is recombined at the dichroic beam separator and passed to the beamsplitter which provides the combiner to cause the recombined beams to interfere with their respective beams reflected back from the sample, wherein a further dichroic beamsplitter is provided to direct long coherence length interference light to a photodetector and short coherence length interference light to the detector.

2. An interferometer apparatus comprising:
a short coherence length or broadband light source; a light director to direct light from the light source along a measurement path to a surface of a sample and also along a reference path to a reference surface;
a wavelength disperser to cause wavelength dispersion of light along one of the measurement and the reference paths; a combiner to cause light from the sample surface and light from the reference surface to produce an interference pattern or interferogram;
a detector to detect intensity values of the interference pattern as a function of wavelength;
a determiner to determine from the detected intensity values the wavelength at which the measurement and reference paths are balanced, wherein the wavelength disperser is at least one of: a grating wavelength disperser, a prism wavelength disperser, and an optical dispersive medium;
a heterodyning interferometer having a long coherence length laser source;
a combiner to combine light from the short coherence length source and the long coherence length laser source, the separator comprising a beamsplitter to split the combined beam into a measurement beam directed to the sample and a reference beam;
a dichroic beam separator to separate light at the long coherence length laser source wavelength from the short coherence length source light to the wavelength disperser;
a frequency converter to up-shift the optical frequency to provide a frequency-shifted beam;
a dichroic beamsplitter to separate light returning from the sample into the long coherence length and short coherence length wavelengths; and
a mirror to deflect the long coherence length light to a beamsplitter where it interferes with the frequency-shifted beam to produce an interference beam containing the optically mixed frequency components which is incident on a photodetector and a detection system to extract the phase change of the output of photodetector.

3. Apparatus according to claim 2, wherein the frequency up-shifter comprises two acousto-optic devices (AODs).

4. Apparatus according to claim 3, wherein the detection system comprises a low pass filter to output a signal at a difference frequency representing the difference frequency between the long coherence length source frequency and the up-shifted frequency, a generator to generate a phase-stable reference electrical signal at the difference frequency and a phase sensitive detector configured to use the reference electrical signal to track or lock to the phase change of the signal obtained from the photodetector.

5. An interferometer apparatus comprising:
a short coherence length or broadband light source;
a light director to direct light from the light source along a measurement path to a surface of a sample and also along a reference path to a reference surface;
a fibre optic combiner to couple light from the short coherence length source into a length of optical fibre;
a remote objective lens assembly coupled to the optical fibre to focus or collimate light exiting the optical fibre onto the sample to provide a measurement beam on the measurement path, wherein the objective lens assembly has a partially reflective surface so that a proportion of the light is reflected back along the optical fibre to provide a reference beam on the reference path;
a wavelength disperser to cause wavelength dispersion of light along one of the measurement and the reference paths;
a further combiner to cause light from the sample surface and light from the reference surface to produce an interference pattern or interferogram;
a detector to detect intensity values of the interference pattern as a function of wavelength; and
a determiner to determine from the detected intensity values the wavelength at which the measurement and reference paths are balanced, wherein the wavelength disperser is at least one of: a grating wavelength disperser, a prism wavelength disperser, and an optical dispersive medium.

* * * * *